J. B. WANTZ.
X-RAY APPARATUS.
APPLICATION FILED JAN. 29, 1914.

1,239,145.

Patented Sept. 4, 1917.
5 SHEETS—SHEET 1.

WITNESSES

INVENTOR
Julius B. Wantz

ATTORNEYS

UNITED STATES PATENT OFFICE.

JULIUS B. WANTZ, OF CHICAGO, ILLINOIS, ASSIGNOR, BY MESNE ASSIGNMENTS, TO VICTOR ELECTRIC CORPORATION, OF CHICAGO, ILLINOIS, A CORPORATION OF NEW YORK.

X-RAY APPARATUS.

1,239,145.      Specification of Letters Patent.      Patented Sept. 4, 1917.

Application filed January 29, 1914. Serial No. 815,201.

*To all whom it may concern:*

Be it known that I, JULIUS B. WANTZ, a citizen of the United States, residing at Chicago, in the county of Cook and State of Illinois, have invented a new and useful Improvement in X-Ray Apparatus, of which the following is a specification.

My invention relates more particularly to improvements in supporting mechanism for X-ray tubes, one of the features, however, of my invention relating also to the supporting of a fluorescent viewing-screen for use in connection with the X-ray tube.

My primary objects, generally stated, are to provide means for supporting the X-ray tube in any position desired, and without danger of short-circuiting, for examining a patient, or producing photographs thereof, stereoscopic or otherwise; to provide indicator means whereby when an adjustment of certain parts of the X-ray tube holder are made and the relative positions of the parts disturbed, they may be quickly returned to adjusted position without requiring the entire readjustment of parts initially made; to provide means on the X-ray tube holder for supporting a fluorescent screen to be used in connection with the X-ray tube; to provide means on the extremity of the ray-confining tube for pressing against the body of a patient when necessary to permit the X-ray tube to be positioned at the proper distance from a particular point in the body and displace tissue which if not displaced would unduly obstruct the rays; to provide improved finder means to centralize the X-ray tube relative to a particular point in the body; to provide improved means for housing the X-ray tube; and, generally, to so improve upon holders for X-ray tubes that they will be better adapted to the uses for which they are intended.

Referring to the accompanying drawings—

In the particular illustrated embodiment of my invention, I provide a standard in the form of a hollow cylindrical column 20, extending upwardly from a base 21 supported on rollers 22 and provided with check devices 23, which may be adjusted into position for engaging with the floor on which the base 21 rests, to prevent movement of the apparatus after it has been properly positioned on the floor. Surrounding the column 20 and movable up and down thereon is a sleeve 24 carrying a key 25 which slides in a key-way 26 in the outer surface of the column 20 and extending longitudinally thereof, whereby the sleeve 24 may be moved up and down on the column 20 but is held against rotation thereon.

The upper and lower ends of the sleeve 24 are equipped with heads 27 and 28 of larger diameter than the sleeve 24 and forming shoulders between which a sleeve-member 29, rotatable relatively to the sleeve 24 is positioned, the head 28 of the sleeve 24 being equipped with a set-screw 30 for holding the sleeve 24 in vertically adjusted position on the column 20, and the sleeve-section 29 being provided with a set-screw 31 adapted to bear against the sleeve 24 for holding the sleeve-section 29 in axially adjusted position about the sleeve 24. The upper end of the sleeve-section 29 is equipped with a pointer 32 carried by a ring 33 having pins 34 which extend into a groove 35 in the section 29, which thus permits the ring 33 with the pointer 32 to be adjusted about the sleeve-section 29, as desired, the purpose of the construction just described being to provide means whereby after once adjusting the sleeve 29, either axially or longitudinally of the column 20, or both, it may be returned to adjusted position readily and quickly, and to this end, I prefer to provide on the column 20 a scale, diagrammatically illustrated at 36 in Fig. 1, the pointer 32 coöperating with the longitudinal line on the column 20 formed by the key-way 26, and with the vertical graduations thereon.

Extending laterally of the column 20 is a track 37 formed of parallel bars 38 square in cross-section and connected together at their opposite ends by cross-pieces 39 and 40. The cross-piece 40 is provided with a disk-portion 41 which bears flatwise against a similar disk-portion 42 formed on the sleeve-section 29, a shaft 43, connected at its inner end with the sleeve-section 29 and extending through an opening 44 in the disk 41, being provided at its outer threaded extremity 45 with a handle-equipped nut 46, the construction just described serving to rotatably support the track 37 upon the sleeve 29 and afford frictional engagement of these parts for holding the track, and the hereinafter described parts carried thereby, in any position of axial adjustment about the shaft 43.

Figure 11:
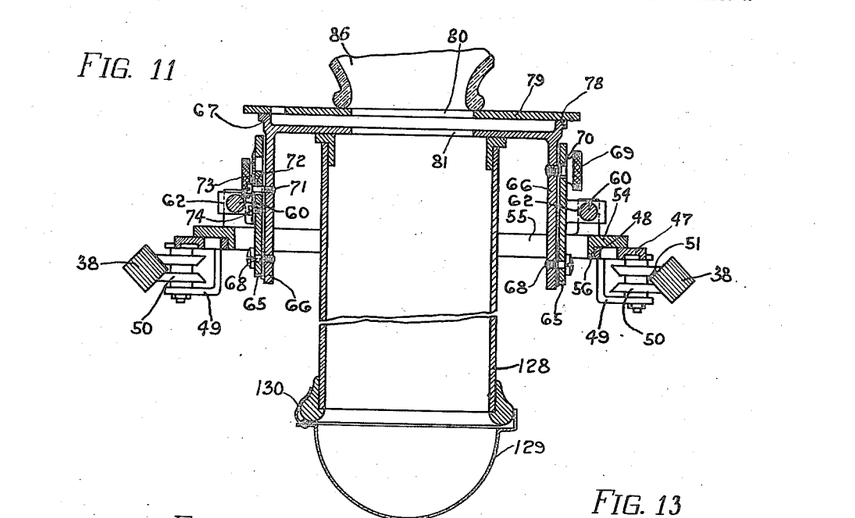
Fig. 11 is an enlarged section taken at the line 11 on Fig. 1 and viewed in the direction of the arrow.

At 47 is represented a plate provided at its center with a circular opening 48, this plate being provided at each of its four corners with a bracket 49 in which brackets, rollers 50 having peripheral grooves 51 straddling the inner angular surfaces of the track-bars 38, as shown in Fig. 11, are journaled, whereby the plate 47 is free to be moved lengthwise of the track 37, the plate 47 being equipped with a bracket 52 carrying a set-screw 53, adapted to engage with the adjacent one of the track-bars 38 for holding the plate 47 and the parts carried thereby in its position of adjustment lengthwise of said track.

Surmounting the plate 47 is a ring 54 provided about its central opening 55 with a depending annular flange 56, which extends into the circular opening 48 and has journal fit therein, thus permitting the ring 54 to be adjusted axially on the plate 47. The ring 54 is provided with depending set-screws 57, which pass through diametrically-opposed, arc-shaped slots 58, in the plate 47. By means of these set-screws the ring 54 may be releasably secured in axially-adjusted position upon the plate 47. Extending upwardly from the ring 54 are lugs 59 in which parallel rods 60 are fixed at opposite edges of the ring 54, these rods forming guides for a rectangular frame 61, provided with lugs 62, slidably engaging the rods 60, whereby the frame 61 may be adjusted on the ring-member 54.

One of the rods 60 carries sleeves 63 slidable thereon and located beyond the lugs 62. These sleeves are provided with set-screws 64 by which they may be gripped to the rod 60 on which they slide, and by their adjustment on this rod, may hold the frame 61 in the position to which it is adjusted lengthwise of the rods 60.

Figure 5:
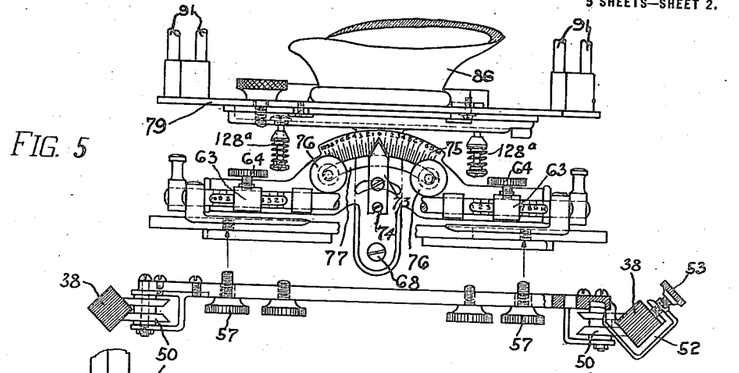
Fig. 5 is a view in elevation of a portion of the mechanism supported from the standard and carrying the holder proper for the X-ray tube, a portion of this mechanism being shown disconnected from the other portion thereof and below the latter, but in direct line therewith, and a part of this view being in section taken at the line $x$—$y$ on Fig. 6 and viewed in the direction of the arrow.
Figure 6:
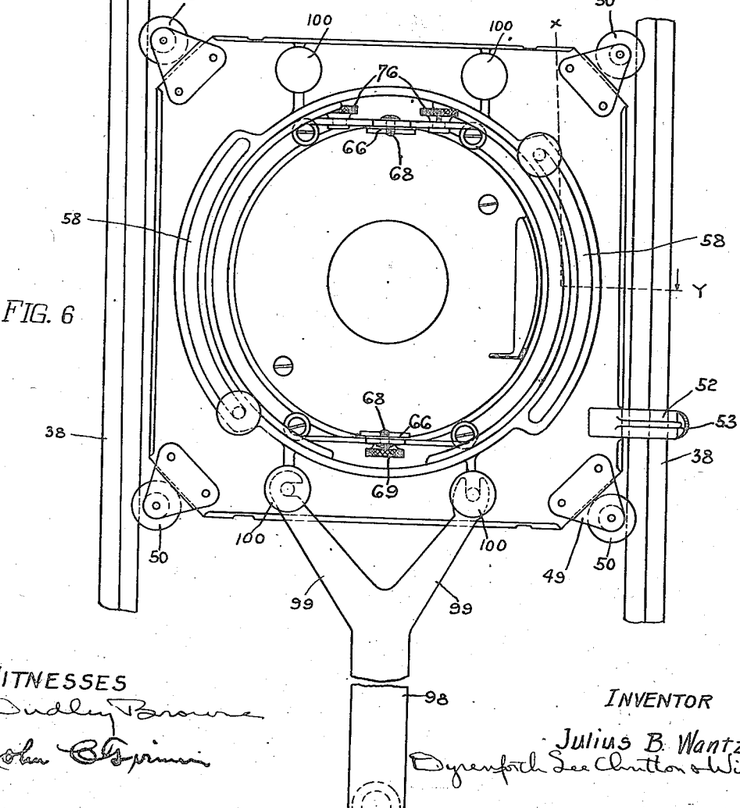
Fig. 6 is a bottom plan view of the mechanism illustrated in Fig. 5.
Figure 7:
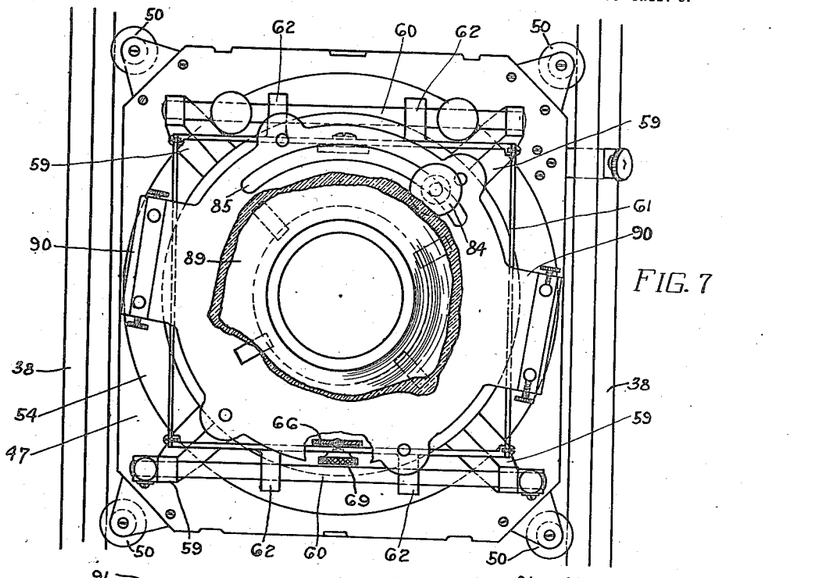
Fig. 7 is a top plan view of the structure shown in Fig. 6.

The frame 61 is provided at opposite sides with depending ears 65, to the lower ends of which the lower ends of similar ears 66 carried by a plate-member 67 are pivoted, as indicated at 68, which thus permits of the rocking of the member 67 on the frame 61. One of the depending ears 66 carries a set-screw 69 which extends through an arc-shaped slot 70 in the adjacent ear 65 and by which the plate-section 67, with the parts carried thereby, may be held in adjusted position when rocked on the pivots 68, as hereinbefore stated. The other of the ears 66 is provided with a pin 71 which extends through an arc-shaped slot 72 in the adjacent ear 65 and connects with a pointer 73 pivotally supported, as indicated at 74, on the last-referred to ear 65, this pointer coöperating with a scale 75 formed on the frame 61, which is graduated equally in opposite directions from the zero point indicated thereon (Fig. 5). Clamping-screws 76, adjustable in a slot 77 in the frame 61, are provided for engagement with the pointer 73 so that by setting the screws 76 in the slot 77, the degree to which the plate-section 67 and the parts carried thereby may be tilted either to the right or to the left in Fig. 5, may be accurately controlled.

The plate-section 67 is provided peripherally with an annular flange 78, and supported on this plate and rotatable thereon is a disk 79 containing a central aperture 80 which registers with a central aperture 81 in the plate-section 67. The disk 79 is held against displacement on the plate-section 67 by means of depending pins 82 carried by the disk 79 and overlapping, at their headed portions 83, the underside of the flange 78, thus permitting the disk 79 to be rotated on the plate 67, but preventing accidental separation of these parts. Means are provided for releasably securing the disk 79 in axially adjusted position on the plate 67, these means comprising an upwardly-extending set-screw 84 carried by the plate-section 67 and extending upwardly through an arc-shaped slot 85 in the disk 79. The disk 79 carries on its upper side a holder 86 for the X-ray tube 87 which is firmly secured to the disk 79, as through the medium of clamps 88 in accordance with common practice, the holder 86 being recessed at diametrically opposite sides, as indicated at 89, to receive the reduced ends of the tube 87. The opposite sides of the disk 79 are provided with extensions 90 which are in line with the recesses 89 and carry clamping devices for engaging the ends of the tube 87 to hold the latter at the desired elevation relative to the disk 79. The form of clamping device illustrated comprises spaced upright rods 91 mounted on the extensions 90, and a pair of blocks 92 cooperating with each set of rods 91 and adjustable thereon for clamping the ends of the tube 87 between them, set-screws 93 on the blocks 92 being provided for holding the latter in adjusted position.

It will be understood from the foregoing that in so far as the preceding description is concerned, the following adjustments may be made. The sleeve-section 29 being rotatable upon the sleeve 24 which latter slides up and down on the column 20, the track 37 may be raised and lowered and swung in a horizontal plane to any position desired. The track 37 being rotatably mounted upon the sleeve-section 29, it may be adjusted to any position about its axis of rotation. The plate 47 being connected with the track 37 by the rollers 50, this plate and all the parts carried thereby may be bodily shifted lengthwise of the track 37. The rotatable mounting of the ring 54 on the plate 47 permits this ring and the parts carried thereby to be axially adjusted on the plate 47 by which the angular relation of the guide-rods 60 to the track 37 may be varied, as desired, even to making them parallel. The plate-section 67 being pivotally connected at its lugs 66 with the frame 61, the plate section 67 may be rocked on the pivots 68 from one side to the other, except as restrained by the clamping screws 76 in their preliminarily set position; and the disk 79 being rotatably mounted on the plate-section 67, this disk which supports the holder in which the lamp 87 is mounted may be rotated on the plate-section 67 for the purpose hereinafter stated.

It will be readily understood that by the various adjustments provided the holder 86 may be caused to present a wide variation of positions, not only those required for the making of stereoscopic photographs as well as those of other kinds, but also those required for examining a patient. A particularly desirable feature of my apparatus is that of so mounting the holder for the X-ray tube that it may be swung from one side to the other on its horizontal pivots 68 regardless of the adjustment of the support for these pivots in a horizontal plane, this feature being especially desirable in stereoscopic work.

It often becomes desirable after adjusting the sleeve-sections 24 and 29 on the column 20, to swing the track 37 and the parts carried thereby out of adjusted position preliminary to returning them to adjusted position, and to obviate the necessity of repeating the steps necessary to be taken for making an initial adjustment, the pointer 32 is provided. When the operator has adjusted the sleeve-sections 24 and 29 to the desired positions, he turns the ring 33 on the sleeve 24 until the pointer 32 coincides with the key-way 26, thereupon tightening the set-screw 34. By noting the particular graduation on the column 20 opposite to which the pointer 32 extends, the operator, should it become desirable to disturb the adjustment of the sleeves 24 and 29 on the column 20, may readily readjust these sleeves on the column 20 by swinging them to a position in which the pointer 32 will line up with the key-way and register with the particular graduation of the scale 26 with which it registered in the initial adjustment.

In order that the devices through the medium of which the lamp 87 is supported on the column 20, may be raised and lowered with ease, I provide a counterweight 94 which is located preferably in the column 20 and connects with a cable 95 which extends upwardly over a pulley 96 and connects at its opposite end with an eye 97 on the portion 27 of the sleeve 24; and to facilitate the axial adjustment of the track 37 and the parts carried thereby, on the sleeve-section 29, I provide a handle device which in the preferred construction illustrated comprises a handle 98 provided with forked-arms 99 at which it is adapted to be applied to either end of the mechanism which operates on the track 37, set-screws 100 being provided for this purpose.

The preferred embodiment of my invention includes means for supporting a fluorescent screen in proper relation to the X-ray tube for the purpose of examining a patient, the means shown for this purpose comprising an angle-shaped frame work 101 connected near one end with a clamp device 102 secured on the upper end of the column 20. The frame 101 carries two pulleys 103 and 103ᵃ which are spaced apart and over which cords 104 and 105 extend, the cords at their depending ends being adapted to be connected with a fluorescent screen 106 and the pulleys 103 and 103ᵃ so disposed that the screen 106 when extending in the same or substantially the same horizontal plane as the tube 87, will directly oppose the latter. The other ends of the cords 104 and 105 pass over a double pulley 107 and thence over pulleys 108 and 109, respectively, on the frame work 101, these ends of the cords 104 and 105 being united and engaging a pulley 110 connected with a counterweight 111, thus supporting the latter from these cables, the counterweight 111 being preferably of such weight as will cause the screen 106 to be maintained in any vertical position into which it is moved by the operator; it being understood that when the screen 106 is used, the track 37 would be axially rotated through ninety degrees from the position illustrated in Fig. 1 in order that the rays from the tube 97 will be directed horizontally or substantially horizontally into the patient.

Figure 8:
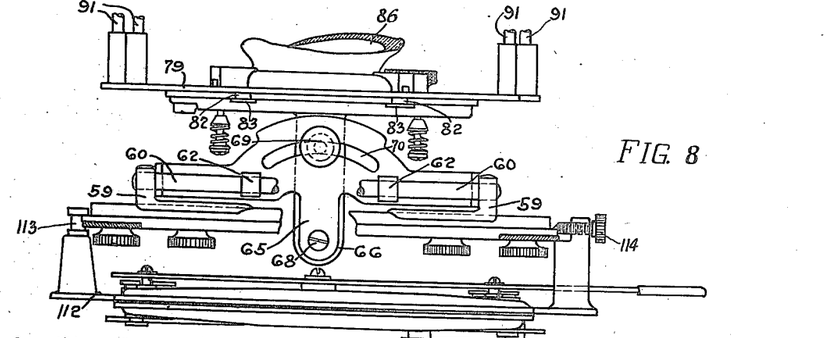
Fig. 8 is a view in elevation of the mechanism shown in Fig. 7, with a shutter, shown in elevation, attached thereto.
Figures 9, 10:
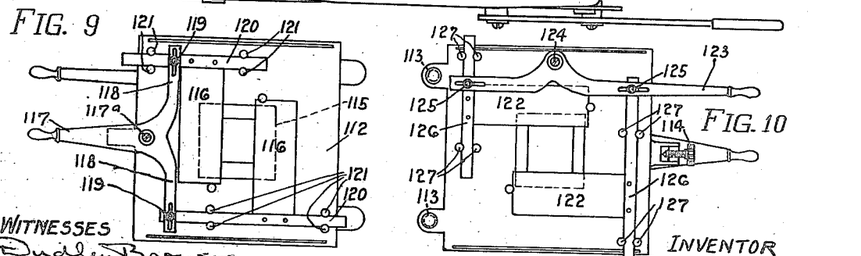
Figs. 9 and 10 are views of the opposite sides, respectively, of the shutter device shown in Fig. 8.

It is customary in using X-ray apparatus to provide means for varying the opening through which the X-rays may pass, and I have therefore shown in Figs. 8, 9 and 10 a form of shutter device for this purpose. The device illustrated comprises a plate-section 112 adapted to be releasably connected with the plate 47 through the medium of shouldered pins 113 and a set-screw 114. The plate 112 contains a central opening 115 which registers with the openings 80 and 81 in the disk 79 and plate-section 67, respectively. At one side of the plate 112 is a pair of shutter plates 116 adapted to be moved toward and away from each other over the opening 115 through the medium of a lever 117, fulcrumed at 117ᵃ and having oppositely extending arms 118 which are pivotally connected as indicated at 119 with bars 120 guided by rollers 121 and to which the plates 116 are secured. At the opposite side of the plate 112 are shutter plates 122 which are movable toward and away from each other across the opening 115, but in a direction at right angles to that in which the plates 116 move. The means for operating the plates 122 comprise a lever 123 fulcrumed to the plate 112 as indicated at 124 and pivotally connected at opposite sides of its fulcrum, as indicated at 125, with bars 126 guidedly confined between rollers 127 and carrying the plates 122.

It will be understood from the foregoing that the size and shape of the opening produced by the shutter device may be varied as desired by adjusting the respective shutters 116 and 122, as heretofore described.

It is customary in the use of X-ray apparatus to provide a ray-confining tube through which the X-rays are projected into the patient, such a tube being represented at 128 and connected with the plate-section 67 in any suitable manner, as by a bayonet-joint connection with the pins 128ᵃ. In using X-ray apparatus, it is necessary that the tube occupy a certain position relative to the body to be viewed or to the part of the body to be viewed or to be photographed, and this oftentimes makes necessary the pressing of the tube 128 firmly against the body of the patient. In order that such pressure may be applied to the best advantage, I provide the outer end of the tube 128 with a member 129 of such material that the X-rays will penetrate it, as, for example, aluminum, the member 129 being preferably rounded, as indicated, and preferably detachably connected with the tube 128 as through the medium of spring clips 130.

In the preferred illustrated embodiment of my invention, I have provided means for forcing against the body of the patient that portion of the apparatus which in practice engages therewith, where this practice is followed, so that it will operate to apply the desired pressure. These means comprise a sleeve 131 slidable up and down on the column 20 and located below the sleeve head 28, a rack 132 pivotally connected at its lower end to the sleeve 131, as indicated at 133, and slidable at its upper end between ears 134 on the sleeve-head 28 and meshing at its teeth 135 with a gear 136 journaled in the ears 134 and connected with a handle-portion 137.

In the use of the apparatus, after the tube 87 has been adjusted relative to the body of the patient, the operator tightens up the set-screw 138 on the sleeve 131 for gripping this sleeve to the column, and by turning the gear 136 to draw the sleeve-sections 24 and 29 and the parts carried thereby, downwardly to cause the tube 128 or the member 129, as the case may be, to be forced with the desired pressure against the body of the patient.

Figures 12, 13, 14:
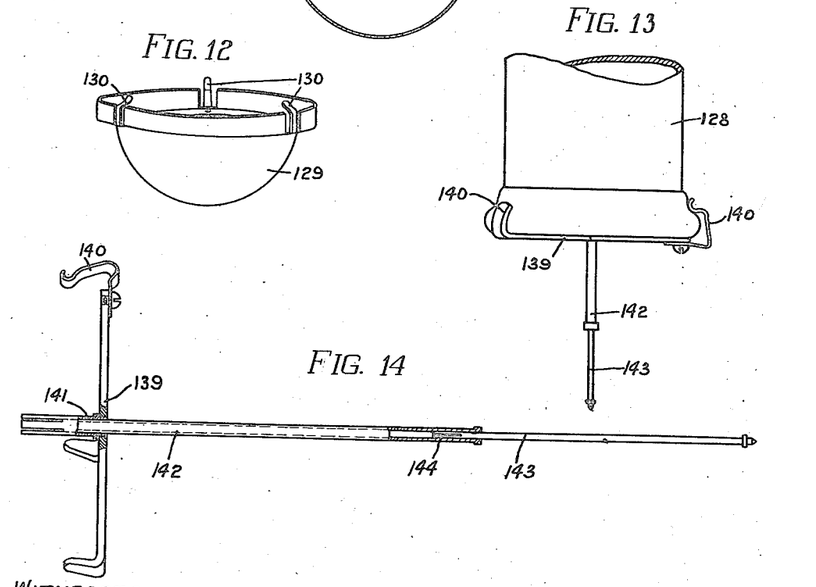
Fig. 12 is a perspective view of my improved means for engaging with the body of the patient for positioning the X-ray tube relative to a particular point in the body.
Fig. 13 is a view in elevation of the outer end of the ray-confining tube equipped with my improved finder means.
Fig. 14 is a view in elevation, partly sectional of the improved finder means illustrated in Fig. 13.

Another feature of my invention is that of providing a finder device illustrated in Figs. 13 and 14 for aiding the centering of the tube 128 relative to the part of the body into which the X-rays are to be projected. The preferred form of these means comprises an open-work plate 139 provided with clips 140 at which it is adapted to be releasably secured to the outer end of the tube 128. Secured in a sleeve 141 on the frame 139 is a tube 142 with which telescopes a rod 143, the inner end of this rod being split, as indicated at 144, to provide frictional engagement between these telescoping parts. It will be readily understood that by adjusting the rod 143 in the tube 142, to cause the outer extremity of this rod to approach the body of the patient, the tube 128 may be accurately centered relative to any particular point on the body of the patient.

Figure 15:
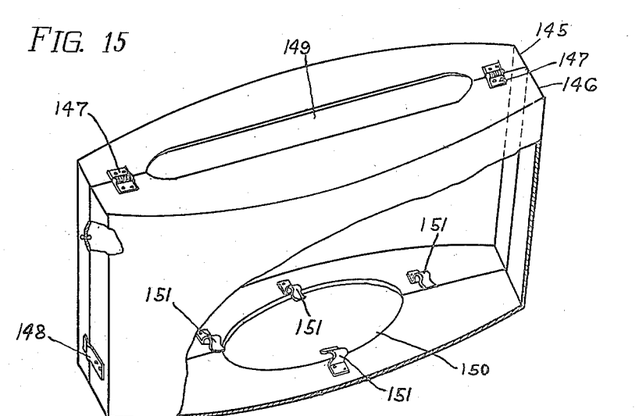
Fig. 15 is a perspective view of my improved means for housing the X-ray tube.
Figure 16:
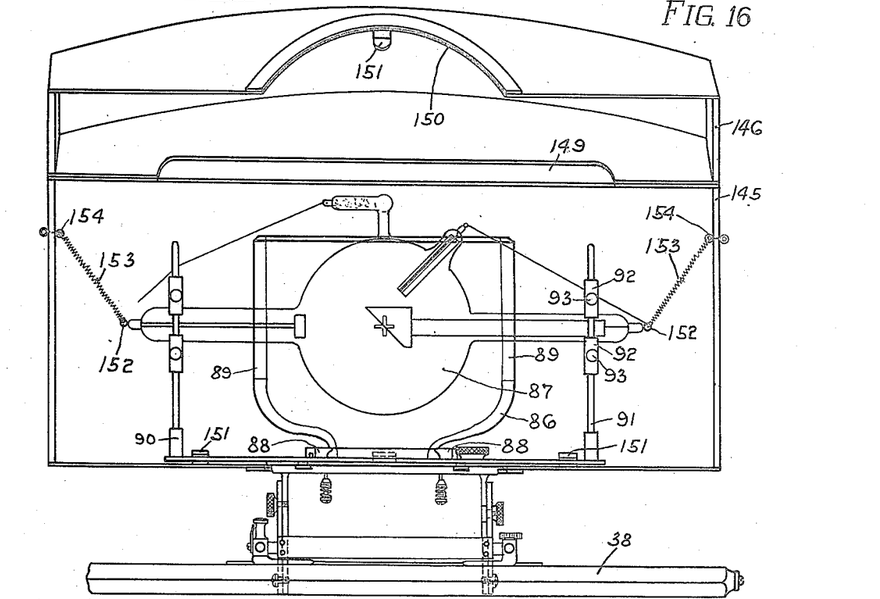
Fig. 16, a view showing the casing of Fig. 15 applied to the X-ray tube holder mechanism, but with one section of the casing raised.

It is desirable that the operator be shielded as much as possible from the rays issuing from the X-ray tube 87, and that illumination of the room from the tube be prevented in the case of making X-ray examinations, and to this end I have devised, as an adjunct to a support for such a tube, a form of casing which may be readily applied to and removed from the support, and which, when in position thereon, will serve to accomplish these results. My improved casing is represented in Figs. 15 and 16, and, as shown, it is formed of two similar sections 145 and 146 of material opaque to illuminating rays and preferably X-rays and hinged together, as indicated at 147, at their upper edges, and provided at opposite ends with latch devices 148 (one only of which is shown) for holding the casing-sections together. The top of the casing preferably contains an opening 149 and at its bottom is apertured, as indicated at 150, at which aperture it surrounds the plate-section 67, the casing being held in position on the disk 79 through the medium of spring-clips 151 adapted to rest upon the upper side of this disk. The binding-posts 152 of the tube 87 are preferably connected with springs 153 secured to binding-posts 154 on the casing, the wires (not shown) for conducting induced current, from any suitable source thereof, to the tube 87, connecting with the binding-posts 154.

It will be noted that by revolubly mounting the disk 79 on the plate-section 67, the tube 87 may be caused to extend at substantially right angles to the direction in which the current-conducting wires connected therewith extend, regardless of the adjustments made of the other elements carried by the track 37, this being of advantage as it is necessary, owing to the high intensity of the current used for operating the tube 87, that the current-conducting wires be held a relatively great distance apart at all times.

Figures 1, 2, 3, 4:
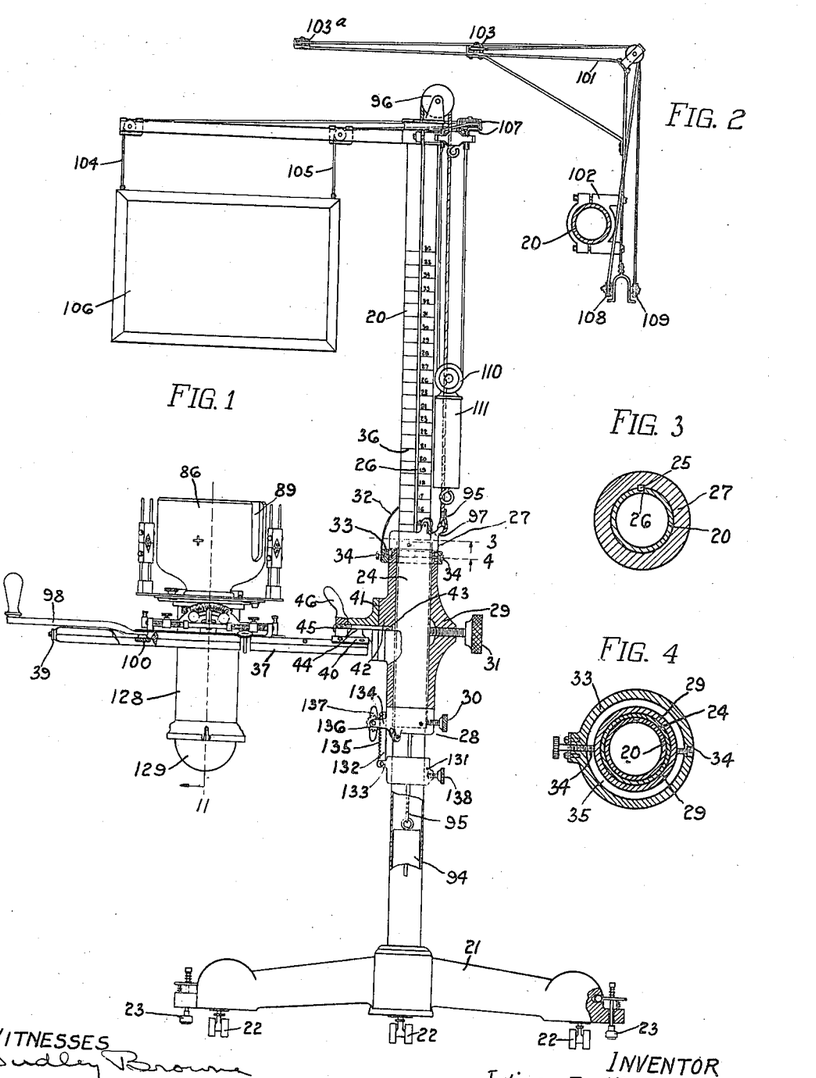
Figure 1 is a view in elevation partly sectional of an X-ray apparatus constructed in accordance with my invention.
Fig. 2 is a view in plan of a fluorescent screen-supporting member carried by the standard of the apparatus shown in Fig. 1, said standard being shown in section.
Fig. 3 is an enlarged section taken at the line 3 on Fig. 1 and viewed in the direction of the arrow.
Fig. 4 is an enlarged section taken at the line 4 on Fig. 1 and viewed in the direction of the arrow.

The counter-weight 94 is shown in Fig. 1 as relatively close to the lower end of the column, it being so shown in order that it will not confuse the other details of the structure shown in this figure. In practice, however, when the tube-support of which the guideways 37 are a part, is at the elevation shown in this figure, the counter-weight would extend at a considerably higher distance than that shown, in order that the tube-support might be counter-weighted throughout its desired movement up and down along the column.

While I have illustrated and described a particular embodiment of my invention, I do not wish to be understood as intending to limit it thereto, as the same may be variously modified and altered without departing from the spirit of my invention, it being my intention to claim my invention as broadly and fully as the prior state of the art will permit.

What I claim as new and desire to secure by Letters Patent is—

1. In X-ray apparatus, the combination of a column, a sleeve slidable longitudinally thereon, means holding said sleeve against rotation, a second sleeve surrounding and journaled on said first-named sleeve and held against longitudinal movement thereon, a guide-way rotatably mounted on said second-named sleeve, and a tube-supporting member mounted and slidable on said guide-way.

2. In X-ray apparatus, the combination of a column, a sleeve slidable longitudinally thereon, means holding said sleeve against rotation, a second sleeve surrounding and journaled on said first-named sleeve and held against longitudinal movement thereon, a guide-way rotatably mounted on said second-named sleeve, a tube-supporting member pivotally mounted and slidable on said guide-way, and adjustable means for limiting the tilting of said holder device.

3. In X-ray apparatus, the combination of a column, a member surrounding said column and adjustable up and down thereon and about the axis of said column, and carrying guide-ways laterally projecting therefrom and spaced apart, a slide member engaging said guide-ways and movable lengthwise thereof, a holder-device for an X-ray tube pivotally mounted on said slide member, the pivot of said holder device extending transversely of said guide-ways, and counterbalancing means for said member constructed and arranged to permit the latter to be adjusted up and down, and about, said column.

4. In X-ray apparatus, the combination of a column, a member surrounding said column and adjustable up and down thereon, and about the axis of said column and carrying guide-ways laterally projecting therefrom and spaced apart, said guide-ways being pivotally supported on said member with the axis of said pivot extending at an angle to said column, a slide-member engaging said guide-ways and movable lengthwise thereof, a holder-device for an X-ray tube pivotally mounted on said slide-member, the pivot of said holder-device extending transversely of said guide-ways, and counter-balancing means for said first-named member constructed and arranged to permit the latter to be adjusted up and down, and about, said column.

5. In X-ray apparatus, the combination of a column, a member surrounding said column and adjustable up and down thereon, and about the axis of said column and carrying guide-ways laterally projecting therefrom and spaced apart, a member engaging said guide-ways and adjustable lengthwise of the latter, a holder-device for an X-ray tube pivotally connected with said last-named member, the pivot of said holder-device extending transversely of said guide, and counter-balancing means for said first-named member constructed and arranged to permit the latter to be adjusted up and down, and about, said column.

6. In X-ray apparatus, the combination of an upright support, a laterally-extending member on said support having guide-ways spaced apart, a member engaging said guide-ways and adjustable lengthwise of the latter, a second member axially adjustable on said first named member with said axis at an angle to said guide-ways, and a third member pivotally supported on said second member, for the purpose set forth.

7. In X-ray apparatus, the combination of an upright support, a laterally-extending member adjustably mounted on said support and having guide-ways spaced apart, a member engaging said guide-ways and adjustable lengthwise of the latter, a third member axially adjustable on said second named member with said axis at an angle to said guide-ways, and a fourth member pivotally supported on said third member, for the purpose set forth.

8. In X-ray apparatus, the combination of an upright support, a laterally-extending member mounted on said support and having guide-ways spaced apart, a second member adjustable on said guide-ways, a third member axially adjustable on said second member, a fourth member lineally adjustable on said third member, and a fifth member pivotally connected with said fourth member.

9. In X-ray apparatus, the combination of an upright support, a laterally-extending member adjustably mounted on said support and having guide-ways spaced apart, a second member adjustable on said guide-ways, a third member axially adjustable on said second member, with said axis at an angle to said guide-ways, a fourth member lineally adjustable on said third member, and a fifth member pivotally connected with said fourth member.

10. In X-ray apparatus, the combination of an upright support, a laterally-extending member mounted on said support and having guide-ways spaced apart, a second member engaging said guide-ways and adjustable lengthwise of the latter, a third member axially adjustable on said second member, a fourth member lineally adjustable on said third member, a fifth member pivotally connected with said fourth member, and a sixth member axially adjustable on said fifth member.

11. In X-ray apparatus, the combination of an upright support, a laterally-projecting guide-way adjustably mounted on said support, a member adjustable on said guide-way, a second member axially adjustable on said first member, with said axis at an angle to said guide-way, a third member lineally adjustable on said second member, a fourth member pivotally connected with said third member, and a fifth member axially adjustable on said fourth member with said axis at an angle to said guide-way.

12. In X-ray apparatus, the combination of an upright support, a laterally-projecting guide-way adjustably supported on said support and axially adjustable thereon in a vertical plane, a member engaging said guide-way, a second member axially adjustable on said first member and carrying guide-means with said axis at an angle to said guide-means, a third member engaging said guide-means and shiftable thereon, a fourth member pivotally connected with said third member, and a fifth member axially adjustable on said fourth member with said axis at an angle to said guide-means.

13. In X-ray apparatus, the combination of an upright support, a laterally-projecting guide-way mounted on said support and formed with spaced guide-portions, a member engaging said guide-portions, a ring axially adjustable on said first-named member and carrying guide-means with said axis at an angle to said guide-means, a second member engaging said guide means and provided with depending lugs, a third member located within said second member and having depending lugs intermediate its sides pivotally connected with the lugs on said second member, and a fourth member axially adjustable on said third member with said axis at an angle to said guide-way.

14. In X-ray apparatus, the combination of an upright support, an X-ray tube-supporting-member mounted on said support, a sleeve beyond said supporting-member, means for releasably clamping said sleeve to said support, a rack connected with one of said members on said support, and a gear on the other of said members engaging with said rack, for the purpose set forth.

15. In X-ray apparatus, the combination of an upright support, a laterally-extending tube-supporting member mounted on said support to be adjusted up and down thereon and about the latter, and indicator means on said member adjustable about the axis of the latter and coöperating with said support for indicating the height at which said member extends, for the purpose set forth.

16. In X-ray apparatus, the combination of an upright support, a laterally-extending X-ray tube-supporting-member adjustable on said support, and indicator means on said member comprising a ring surrounding a portion of said member and axially adjustable thereon, and a pointer carried by said ring and coöperating with said support, for the purpose set forth.

17. In X-ray apparatus, the combination of an upright column, a sleeve surrounding said column and adjustable in axial and longitudinal directions, an X-ray tube-holding device extending laterally from and supported by said sleeve, a ring-shaped member surrounding said sleeve and axially adjustable thereon, and a pointer carried by said sleeve and coöperating with markings on said column, for the purpose set forth.

18. The combination of a support for an X-ray tube including a member having a section transparent to X-rays adapted to support a tube and a removable and replaceable casing opaque to illuminating rays and adapted to surround the tube and containing an opening registering with said transparent section, and means releasably securing said casing to said member.

19. The combination of a support for an X-ray tube including a supporting member having a section transparent to X-rays and adapted to support a tube, a removable and replaceable casing opaque to illuminating and X-rays and adapted to surround the tube and containing an opening registering with said transparent section, and means releasably securing said casing to said member.

20. The combination of an X-ray tube support including a support, a plate carried by said support and adapted to support a tube and containing a section transparent to X-rays, an apertured casing of material opaque to illuminating rays and supported on said plate and adapted to surround an X-ray tube supported thereon and registering at its aperture with said transparent section, and means releasably securing said casing to said member.

21. In X-ray apparatus, the combination of an X-ray tube-holder, a member supported to radiate from the tube, and a presser member extending across the end of said first-named member and formed of material transparent to X-rays.

22. In X-ray apparatus, the combination of an X-ray tube holder, a suitably supported ray-confining tube secured to said holder, and a presser member extending across the outer end of said tube and formed of material transparent to X-rays.

23. In X-ray apparatus, the combination of an X-ray tube-holder, a member supported to radiate from the tube, and a presser-member of general semi-spherical contour secured to the outer end of said first-named member and formed of material transparent to X-rays.

24. In X-ray apparatus, the combination of means for supporting an X-ray tube, a relatively stiff finder device, and means for supporting said device on said first-named means to cause said finder device to project in radial direction from said tube.

25. In X-ray apparatus, the combination of means for supporting an X-ray tube, a finder device formed of relatively adjustable members, and means for supporting said finder device on said first-named means to cause said finder device to project in radial direction from said tube.

26. In X-ray apparatus, the combination of means for supporting an X-ray tube, a finder device formed of telescoping sections, and means for supporting the said finder device on said first-named means to cause said finder device to project in radial direction from said tube.

27. In X-ray apparatus, the combination of an X-ray tube holder, a suitably supported ray-confining tube secured to said holder, and a presser member of general semi-spherical form secured to the outer end of said ray-confining tube and formed of material transparent to X-rays.

28. In X-ray apparatus, the combination of means for supporting an X-ray tube, a suitably supported ray-confining tube, a finder device formed of relatively adjustable, relatively stiff members, and means for securing said finder device on the outer end of said ray-confining tube for holding said finder device in fixed position relative to said ray-confining tube regardless of the tilting of the latter.

29. In X-ray apparatus, the combination of means for supporting an X-ray tube, a suitably supported ray-confining tube, a finder device formed of relatively stiff telescoping members, and means for securing said finder device on the outer end of said ray-confining tube for holding said finder device in fixed position relative to said ray-confining tube regardless of the tilting of the latter.

30. In apparatus of the character set forth, the combination of a support, a fluorescent screen supported thereby to extend at one side of said support, an X-ray tube holder mounted on said support to extend at one side thereof and opposite said screen and having free universal movement in a vertical plane relative to said screen.

31. In apparatus of the character set forth, the combination of a support, a fluorescent screen supported thereby to extend at one side of said support and movable to different angular positions in a horizontal plane, an X-ray tube holder mounted on said support to extend at one side thereof and opposite said screen and having free universal movement in a vertical plane relative to said screen and rotatable on said support in a horizontal plane.

32. In apparatus of the character set forth, the combination of a support, a fluorescent screen supported thereby to extend at one side of said support, an X-ray tube holder mounted on said support to extend at one side thereof and opposite said screen and having free universal movement in a vertical plane relative to said screen, and a handle on said holder extending beyond said tube and accessible to an operator positioned in front of said screen.

33. In apparatus of the character set forth, the combination of an upright support, an X-ray tube holder on said support, a member of general L-shape mounted intermediate the ends of one of its arms on said support in substantially horizontal position, a fluorescent screen, and counter-weight mechanism on said arm for said screen, the flexible members of said mechanism arranged on said arm to support said screen from the other arm of said L-shaped member at one side of said support, and position the counter-weight of said mechanism on the other arm of said member.

34. In X-ray apparatus, the combination of a supporting member, means on said member for supporting an X-ray tube, a laterally-projecting extension on said member of general L-shape, a cord, or the like, engaging said extension with its free ends spaced apart, and depending from said extension near one end thereof for connection with a fluorescent screen, the portion of the cord intermediate its ends being positioned near the other end of the extension, and a counter-weight threaded on said cord to permit the latter to slide therethrough, engaging said cord at the portion thereof adjacent the last referred to end of said extension.

35. In X-ray apparatus, the combination of an upright support, a laterally-extending guide-way on said support, a member movable along said guide-way, a second member rotatable on said first named member in a plane substantially parallel with said guide-way, and an X-ray-tube-holding-member pivoted on said last named member to rock thereon in planes at angles to said guide-way.

36. In X-ray apparatus, the combination of a column, a member longitudinally movable along said column, means for holding said member in adjusted position, a second member rotatable on said column and adjustable longitudinally of the latter and bearing against said first named member, means for securing said second named member in axially adjusted position on said column, and means for supporting an X-ray tube on said second member.

37. In X-ray apparatus, the combination of a column, a member longitudinally movable along said column, means for holding said member in adjusted position, a second member rotatable on said column and adjustable longitudinally of the latter and bearing against said first named member, means for securing said second named member in axially adjusted position on said column, a guide-way mounted on said second member and extending laterally therefrom, and an X-ray tube-holder mounted, and slidable on, said guide-way toward and away from said column.

38. In X-ray apparatus, the combination of a column, a member longitudinally movable along said column, means for holding said member in adjusted position, a second member rotatable on said column and adjustable longitudinally of the latter and bearing against said first named member, means for securing said second named member in axially adjusted position on said column, a guide-way rotatably mounted on said second member and extending laterally therefrom, and an X-ray tube-holder mounted, and slidable on, said guide-way toward and away from said column.

39. In X-ray apparatus, the combination of an upright support, a laterally-extending guide-way on said support, a member movable along said guide-way lengthwise of the latter, and an X-ray-tube-supporting-member axially adjustable on said first named member about an axis substantially co-incident with the center of a tube on said tube-supporting-member.

40. In X-ray apparatus, the combination of an upright support, a laterally-extending guide-way on said support, a member movable along said guide-way lengthwise of the latter, a second member axially adjustable about said first named member, and an X-ray-tube-supporting-member pivoted on said second member, the axis about which said second member rotates being substantially co-incident with the center of a tube on the tube-supporting-member.

41. In X-ray apparatus, the combination of an upright support, a laterally-extending guide-way pivoted on said support, with its axis at an angle to said support, a member movable along said guide-way lengthwise of the latter, and an X-ray-tube-supporting-member axially adjustable on said first named member about an axis substantially co-incident with the center of a tube supported on said tube-supporting-member.

42. In X-ray apparatus, the combination of an upright support, a laterally-extending guide-way pivoted on said support with its axis at an angle to said support, a member movable along said guide-way lengthwise of the latter, a second member axially adjustable about said first named member, and an X-ray-tube-supporting-member pivoted on said second member, the axis about which said second member rotates being substantially co-incident with the center of a tube on the tube-supporting member.

43. In X-ray apparatus, the combination of an upright support, a laterally-extending guide-way on said support, a member movable along said guide-way lengthwise of the latter, a second member axially adjustable on said first named member and provided with guide means, a third member engaging said guide means and adjustable lineally thereon, and a fourth, X-ray-tube-holding-member pivotally connected with said third member, the axis about which said second member is adjustable being substantially co-incident with the center of a tube positioned on said fourth member.

44. In X-ray apparatus, the combination of a column, a member surrounding said column and adjustable up and down thereon, and about the axis of said column, a laterally projecting guideway pivoted on said member to rotate thereon on an axis at an angle to said column, a second X-ray-tube-supporting-member engaging said guide-way and movable therewith about said axis, said guide-way being constructed and arranged to afford movement of said second member along said guide-way in the different axial adjustments of the latter, and counter-balancing means for said first-named member constructed and arranged to permit the latter to be adjusted up and down, and about, said column.

45. In X-ray apparatus, the combination of a column, a member surrounding said column and adjustable up and down thereon, and about the axis of said column and carrying laterally projecting guide-ways spaced apart, a second member engaging said guide-ways and movable along the latter and provided with means for supporting an X-ray tube in a position opposite the space between said guide-ways, and counter-balancing means for said first-named member constructed and arranged to permit the latter to be adjusted up and down, and about, said column.

46. In X-ray apparatus, the combination of a column, a member surrounding said column and adjustable up and down thereon, and about the axis of said column and having laterally projecting guide-ways spaced apart, a second member engaging said guide-ways and movable along the latter, a third member pivoted on said second member on an axis in a plane substantially parallel with the plane in which said guide-ways extend and provided with means for supporting an X-ray tube in a position opposite the space between said guide-ways, and counter-balancing means for said first-named member constructed and arranged to permit the latter to be adjusted up and down, and about, said column.

47. In X-ray apparatus, the combination of a column, a member surrounding said column and adjustable up and down thereon, and about the axis of said column, a laterally extending guide member on said first-named member and adjustable thereon about a substantially horizontal axis, a third member adapted to support an X-ray tube, means for supporting said third member on said second-named member to cause said third member to be adjusted with the latter about the axis and have movement along said second-named member in the different axial adjustments of said members, while being held by said second-named member in said axial adjusted position, and counter-balancing means for said first-named member constructed and arranged to permit the latter to be adjusted up and down, and about, said column.

48. In X-ray apparatus, the combination of a column, a member surrounding said column and adjustable up and down thereon, and about the axis of said column, a laterally extending member on said first-named member and adjustable thereon about a substantially horizontal axis, said second-member having guide-ways spaced apart and extending lengthwise thereon, an X-ray-tube-supporting-member engaging said guide-ways and movable lengthwise thereof, means whereby said third-named member moves with said second-named member in the axial adjustment of the latter and permits movement of said third-named member along said second-named member in the different axial adjustments of said members, and counter-balancing means for said first-named member constructed and arranged to permit the latter to be adjusted up and down, and about, said column.

49. In X-ray apparatus, the combination of a column, a member surrounding said column and adjustable up and down thereon, and about the axis of said column, a guide-way rotatably mounted on said member on an axis extending at an angle to said column to extend laterally of said column with said axis extending parallel with said guide-way, a tube-supporting member mounted, and slidable on, said guide-way, toward, and away from said column, and counter-balancing means for said first-named member constructed and arranged to permit said member to be adjusted up and down, and about, said column.

JULIUS B. WANTZ.

In presence of—
D. C. THORSEN,
O. C. AVISUS.